Patented July 29, 1941

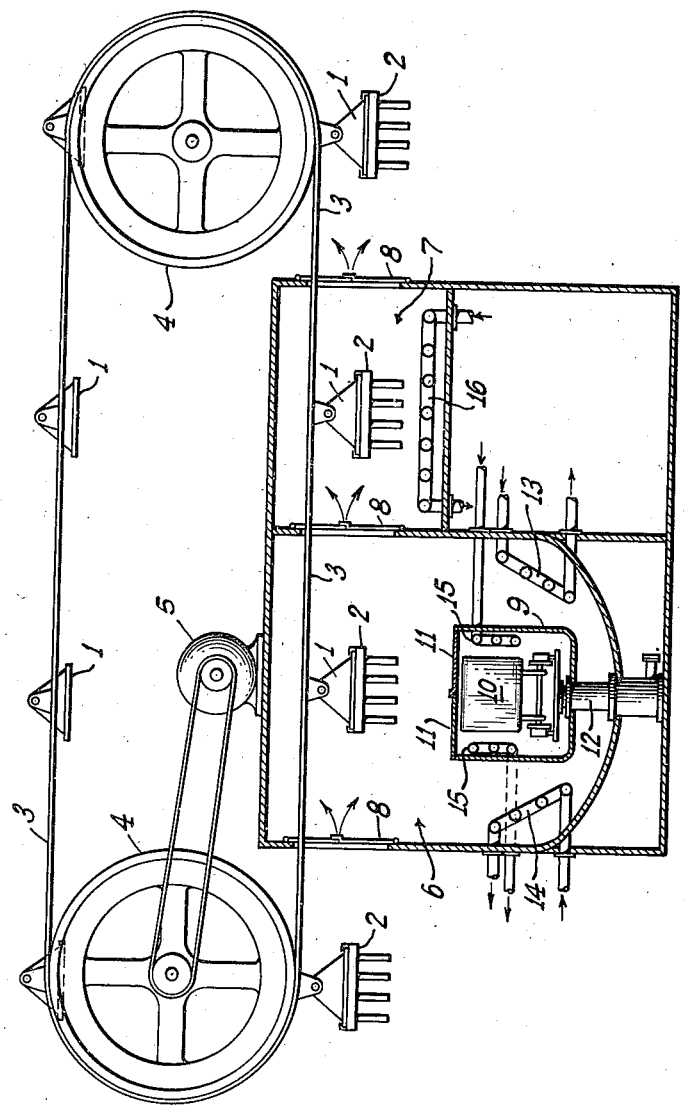

2,251,108

UNITED STATES PATENT OFFICE 2,251,108

METHOD OF PRODUCING SEAMLESS HOLLOW BODIES

Kurt Bratring, Dahlem, Berlin, Germany, assignor to Neocell Products Corporation, a corporation of Delaware Application October 12, 1938, Serial No. 234,620
In Germany June 18, 1938

8 Claims. (Cl. 18—58)

The invention of this application, which is a continuation in part of my former application Ser. No. 218,327, filed July 9, 1938, relates to a process for producing hollow bodies, its object being to eliminate or reduce to a minimum the appearance of air bubbles in such bodies. It is particularly important in connection with the production of hollow bodies with transparent walls, such for example as hollow bodies formed of cellulose acetate, for the presence in such articles of air bubbles, even though they be too small to impair the strength of the article, nevertheless seriously detracts from their appearance.

This problem presented itself to me in very critical form in connection with the commercial manufacture of such hollow bodies on a large scale, by dipping molds in a bath of a dissolved plastic substance and thereafter removing the molds to dry. Since the body must be dried on the mold, and since the drying operation takes considerable time, it is necessary, where any considerable production is required, to dip a large number of molds at once, and to stack the molds closely together in order to take full advantage of the capacity of the dipping bath.

Under such circumstances the dipping operation itself, the mere moving of the molds into and through the bath, causes considerable turbulence in the bath and rapidly increases the amount of air which it contains.

Such a process is very different, from the point of view of bubble formation, from the process of slowly dipping one mold at a time. But it is the only process which leads to large-scale production, or to production at costs low enough to justify the manufacture of these hollow bodies for most of the purposes for which they are used. These bodies are employed as containers for food and other articles; they must be produced in great quantities at low cost if they are to be produced at all.

Air may exist in a dipping bath as discrete bubbles, and also as air in actual solution in the liquid of the bath. In the past it has been customary to reduce the difficulties above described by using a relatively non-viscous, and therefore very thin, solution in the dipping bath, and by heating the bath or allowing it to stand for some length of time at room temperature to permit the air to escape. Heating the bath drives off some of the solvent, which of course must be replaced. Either of the operations referred to interrupts the continuity of the production, correspondingly lessens the output of the machine and increases the cost. Even when the bath has been heated for a considerable time, and has then been brought to normal strength by the addition of new solvent, I have found that in a very short period of use of that bath in quantity production of hollow bodies so much air has been caused to reenter the bath that bubbles are formed in the bodies.

The highly diluted solutions which have been employed in attempts to reduce this bubble difficulty necessarily produce very thin coatings on the dipping molds; frequently coatings having a thickness not exceeding 0.03 mm. With such a solution, if it is desired to produce a hollow body with a wall thickness of say 0.3 mm. it is necessary to dip ten times, which is for most purposes prohibitive from the point of view of cost.

By the invention which I will now describe I have been able to avoid these difficulties and to produce hollow bodies in large quantities continuously on a large scale, at low cost, completely free from bubbles, without being obliged to interrupt the immersion process to get the air out of the bath.

It is customary in immersion processes to maintain the bath at room temperature, and to bring the molds as they come out of the dipping bath into a higher temperature, in order to dry them. For example, in the manufacture of hollow articles from a 10% solution of cellulose acetate in acetone it is customary, after allowing the bath to stand for hours to reduce the amount of air which it contains, to maintain the bath at room temperature, say 18° C., and to maintain the atmosphere into which the molds enter as they leave the dipping bath at 25° C. to facilitate the drying.

In such cases, if the molds are dipped rapidly, and particularly if a number of molds are dipped at once, in considerable quantities, air bubbles will be found in the finished articles. But I have discovered that if the temperature of the atmosphere into which the mold passes as it leaves the dipping bath is lower than the temperature of the bath itself, the tendency to form bubbles is eliminated or greatly reduced; for example I have been able to produce hollow bodies on a large scale by rapidly dipping mold frames each containing 900 molds set close together into a 15% solution of cellulose acetate in acetone, by maintaining the temperature of the atmosphere into which the mold passes as it leaves the bath at 25° C. and maintaining the temperature of the bath between 30 and 35° C.

Further, by thus increasing the concentration of the solution in the dipping bath from 10% to 15%, I reduce the number of immersions required to produce a hollow body of a given thickness.

I find it desirable to maintain the molds, with the hollow bodies thereon at the above prescribed temperature, namely, 5 or 10° C. cooler than the dipping bath, for about thirty minutes; thereupon I pass the mold frames into drying chambers, for example the first drying chamber may be maintained at a temperature around 35° C., and the second drying chamber around 40 to 45° C.

The results above set forth are not based upon theory; they are based upon practical, commercial manufacture of many millions of hollow bodies.

I have satisfied myself by a careful investigation and by repeated experimentation that the true explanation of these results, and the true method of operation of my invention are correctly stated as follows:

I am satisfied that the presence in the finished article of air in true solution is not objectionable, and does not cause loss of transparency or lustre, whereas the presence of discrete air bubbles is highly objectionable for the reasons set for above. It is known that the capacity of liquids to hold gases in solution is a function of the temperature of the liquids such that the higher the temperature of the liquid the less gas it can hold in solution. I believe that in the operation of a large-scale dipping process the liquid in the dipping bath soon becomes practically saturated with air in solution.

If under these circumstances a mold is dipped in the solution and is immediately removed to an atmosphere the temperature of which is higher than the temperature of the solution, the capacity of the film adhering to the mold to retain air in solution is reduced, because of the higher temperature, and the tendency is for the film to become supersaturated with air, merely because of the change of temperature, despite the fact that there has been no change in the amount of air in the film; accordingly air, mixed with vapor of the solvent, comes out of solution and collects in bubbles, much as gas comes out of carbonated beverages when the pressure is reduced and the power of such liquid to maintain gas in solution is correspondingly reduced—for the power of liquids to maintain gas in solution is a function of the pressure as well as of the temperature.

If, on the other hand, the mold with its fluid coating is removed into an atmosphere say 5 or 10° C. cooler than the dipping bath, then, even though the liquid in the dipping bath is fully saturated with air, the film on the mold rapidly cools to a condition in which it is definitely under-saturated, so there is not only no tendency for the air to come out of solution and collect in bubbles, but there is a tendency for any bubbles which may already be formed to disappear by the absorption of the air forming these bubbles by the unsaturated liquid. It is therefore my view that the important thing to be done to produce the effect above described is to maintain the material adhering to the mold in a condition in which it is not saturated with air, as compared with the saturation condition of the liquid in the bath, for a long enough time to enable the article to "set" sufficiently so that there is no danger that air bubbles will subsequently be formed. It is more convenient in large-scale production to obtain this result by a manipulation of temperatures than by a manipulation of pressures.

In carrying out my invention in the best manner known to me, I provide regulable means for maintaining the proper temperature in the immersion bath, as well as in the chamber in which the moulds are situated as they emerge from the bath; for example I may maintain the bath at 35° C., and the chamber at 25° C. After remaining for half an hour in the chamber at 25° C. the articles, still on the moulds, are passed to a drying chamber or series of chambers. When I use two drying chambers I maintain the first one at about 30° to 35° C., and the second at 40° to 45° C. The number of drying chambers is relatively unimportant as a matter of principle; it will depend on the thickness of the formed article, etc. The vital point is to hold the mould for a proper time after dipping at a temperature reasonably below the temperature of the dipping bath.

An embodiment of an apparatus for carrying out the process according to the invention is illustrated by way of example in the accompanying diagrammatic drawing.

An endless conveying belt 3 furnished with supporting means 1 adapted to receive mould supports 2 is driven intermittently on the pulleys 4, 4 by means of an electric motor 5, and traverses successively two gas-tight chambers 6, 7.

During each intermittent step forward doors 8, 9 in the path of the belt 3 are opened, which doors again close when the belt is stationary. The first chamber 6 traversed by the belt 3 contains a separate chamber 9, in which is located the immersion bath 10. This chamber is closed by covers 11. Below the bath 10, there is provided a lifting means 12, for example a hydraulic lifting device. In the stationary condition of the belt 3 one of the supports 2 is situated over the covers 11 of the chamber 9. At the bottom of the immersion chamber 6 there are located heating tubes 13 and cooling tubes 14, whereby the air in that chamber is caused to sink under the cooling action of the cooling tubes 14 and is caused to rise owing to the heating action of the tubes 13. In this way the air in the chamber 6 is maintained continuously in circulation.

By suitable selection of the cooling action of the tubes 14 and the heating action of the tubes 13 the air in the chamber 6 is maintained in circulation at a desired temperature.

Within the chamber 9 are heating tubes 15, 15, which continuously maintain the desired temperature in the air-filled portion of the immersion chamber, which is closed by the covers 11, and accordingly on the dipping bath itself. After the immersion of the moulds, brought about by the lifting and lowering of the immersion bath, the moulds are conducted during the first step on the part of the conveying belt 3 into the chamber 7, in which they are subjected to a drying process until the belt 3 is again moved forwards. In this chamber there are also provided heating tubes 16, which maintain at a desired level the temperature of the drying chamber 7, which latter is separated from the immersion chamber 6. As many such chambers 7, each maintained at a predetermined temperature, may be provided as desired.

The dried moulded articles are finally advanced up to the point of discharge below the final pulley 4, where the mould supports 2 may be detached from the conveying means. At the same time the supporting means 1 on the conveying belt 3, which is situated below the left hand pulley 4 of the immersion apparatus, can be furnished with newly prepared mould supports.

I claim:

1. The method of reducing the tendency to the existence of bubbles in an article produced by a process of dipping molds in a bath containing air in solution which consists in maintaining for a period of time after the dipping operation a condition in which the liquid adhering to the mold is under-saturated with air as compared with the saturation condition of the liquid in the bath.

2. A method of producing articles which comprises immersing molds in a bath of a dissolved plastic substance which contains air in solution, withdrawing said molds from said bath bearing coatings of the plastic substance thereon, and thereupon drying said coatings at a temperature which is less than the temperature prevailing within said bath.

3. In a method of producing articles by the immersion of molds in a bath of a dissolved plastic substance which contains air in solution, and thereafter removing the molds to dry, the step which consists in maintaining above the surface of said bath a temperature which is less than the temperature prevailing within said bath.

4. A method of producing articles which comprises immersing molds in a bath of a dissolved plastic substance, withdrawing said molds from said bath bearing coatings of the plastic substance thereon, and thereupon drying said coatings successively in a plurality of drying chambers, the space above the bath having a temperature which is less than the temperature prevailing within said bath, the temperature of the first drying chamber being substantially equal to the temperature prevailing within said bath; and the temperature of each of said drying chambers being greater than the temperature of the preceding drying chamber.

5. A method of producing articles which comprises immersing molds in a bath of a dissolved plastic substance, withdrawing said molds from said bath into a preliminary drying chamber above said bath having a temperature which is substantially less than that of said bath, and thereupon passing said molds successively through a plurality of adjoining drying chambers having progressively increasing temperatures, the temperature of the first of the said drying chambers being somewhat less than the temperature of said bath.

6. A method of producing articles of cellulose acetate which comprises immersing molds in a solution of cellulose acetate in acetone which contains dissolved gases, withdrawing said molds from said solution bearing coatings of cellulose acetate thereon, and thereupon drying said coatings in at least one drying chamber, the chamber into which said molds are first introduced upon removal from said solution having a temperature which is substantially less than the temperature of said solution.

7. A method of producing articles which comprises immersing molds in a bath of a dissolved plastic substance which contains a substantial quantity of air in solution, maintaining above said bath an atmosphere at a temperature substantially lower than the temperature prevailing within said bath, withdrawing said molds from said bath bearing coatings of the plastic substance thereon, permitting the molds and coatings to adopt said lower temperature by contact with said atmosphere, and permitting said coatings to become partly dry on said molds in said atmosphere.

8. In a process of forming hollow articles which involves simultaneously dipping into a bath such a number of molds and at such a rate as to entrain a substantial quantity of air in the liquid of the bath and thereafter withdrawing the molds from the bath and drying the liquid films adhering to the molds, the step which consists in maintaining in the drying atmosphere, after the withdrawal of the molds from the bath, for a period of time sufficient to allow the liquid films to dry and set sufficiently so that no substantial quantity of bubbles will be formed in them on further drying, a temperature substantially lower than the temperature of the bath whereby the liquid adhering to the molds is undersaturated with air as compared with the saturation condition of the liquid in the bath.

KURT BRATRING.